Sept. 28, 1937.  A. F. GENOVA  2,094,354
PROCESS AND APPARATUS FOR THE INSTANTANEOUS PREPARATION OF ICE CREAM
Filed Jan. 23, 1936
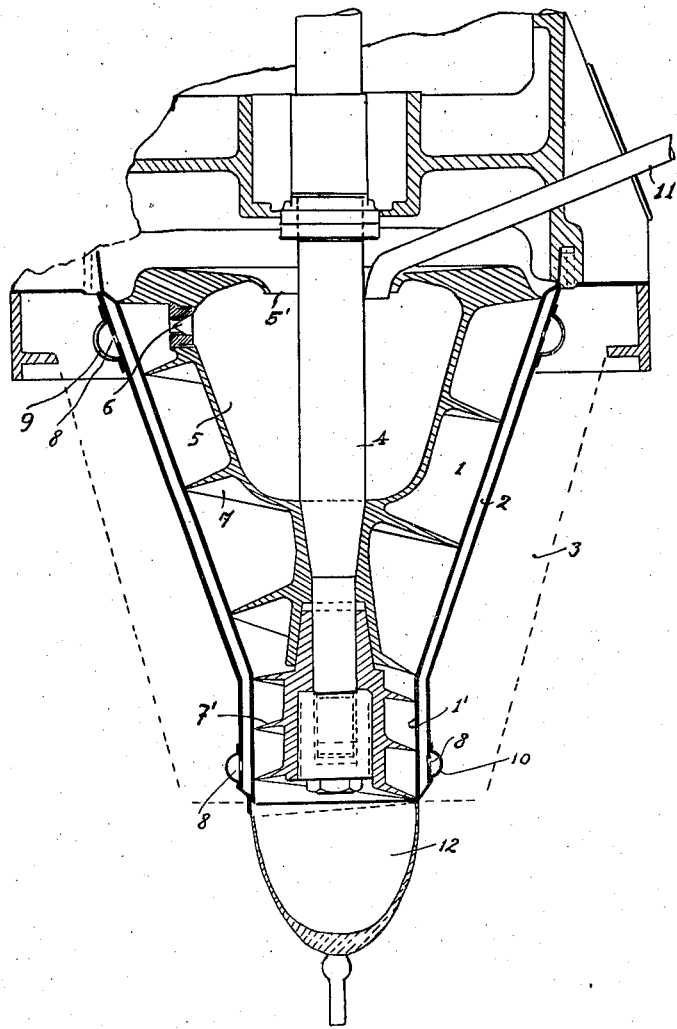
Alberto Francesco GENOVA
INVENTOR
by: Haseltine Lake & Co.
ATTORNEYS.

Patented Sept. 28, 1937

2,094,354

UNITED STATES PATENT OFFICE 2,094,354

PROCESS AND APPARATUS FOR THE INSTANTANEOUS PREPARATION OF ICE CREAM

Alberto Francesco Genova, Treviso, Italy

Application January 23, 1936, Serial No. 60,382
In Germany February 14, 1935

15 Claims. (Cl. 62—114)

As well known, ice cream is prepared by a rather long process viz. by slowly stirring suitable substances in a vessel plunged into ice or other refrigerating agent. The process and apparatus for the instantaneous production of ice cream, forming the subject matter of the present invention permits of instantaneously preparing any kind of ice cream, either in quantities corresponding to the normal portions usually served out to the consumers or in a continuous way.

The process is essentially characterized by the provision of one or more freezers of variable size suitable for the production of one or more ice cream portions or for a continuous production; the freezers may be arranged in various combinations, as may be required, and connected with one another in parallel so that each of them may work independently.

One form of embodiment of the apparatus is illustrated in the accompanying drawing. A funnel-shaped vessel 1 is enclosed by a fully closed chamber 2 and externally protected against transmission of heat by a wall 3. The funnel-like vessel or chamber 1 is open at the top and has a bottom cylindrical portion 1'; in said vessel a shaft 4 is arranged, which may be the shaft of the driving motor or a shaft driven by the motor shaft. To shaft 4, a vessel 5 is coaxially fixed, the vessel 5 being conical and open at the top only; the upper edge being bent inwardly.

In the upper portion of the vessel 5, where its diameter is greater, a hole 6 is pierced, while on the outer surface of said vessel an helix or helicoidal plane 7 is fixed, this helicoidal plane peripherally contacting with the inner surface of chamber 1. A similar helicoidal plane 7' is provided on the shaft 4 within the cylindrical portion 1' of the vessel 1.

The closed chamber 2 or refrigerating chamber is connected at the top and at the bottom, through circularly arranged holes 8, to two annular channels 9 and 10 respectively, suitably connected to the circulating piping for the liquid or gaseous refrigerating agent, this agent supply being controlled in any convenient manner.

Into the aperture 5' a pipe 11 delivers and is connected to the tank containing the substance to be frozen (this tank is not shown on the drawing). 12 is a cup placed under the bottom outlet of the vessel 1; this cup may be replaced by other containers of any desired capacity.

The apparatus works as follows:

Through pipe 11, the substance to be frozen is conveyed into the vessel 5 and the motor started in order to impart a rapid rotation to the revolving portion of the apparatus comprising the vessel 5 and the helicoidal planes 7 and 7'. By centrifugal force, the substance to be frozen is dashed out, through the hole 6, on the wall of chamber 1, this wall being maintained at a suitable temperature by the refrigerating agent circulating in the chamber 2. The substance thus continuously thrown against the wall of chamber 1 expands thereon and is chilled by its contact and then freezes more and more according as it is conveyed further downwardly by the helix 7 until, after getting into the cylindrical body 1', it is forced by the helix 7' into the cup 12 or other container placed underneath the outlet opening of the apparatus.

Of course the constructive and form details may vary in practice without exceeding the scope of the invention.

Having now particularly described and ascertained the nature of my said invention and in what manner the same is to be performed, I declare that what I claim is:—

1. The process for instantaneously producing ice cream and delicacies from syrup and other liquids, which, in combination, consists in centrifugally and continuously spraying a predetermined amount of syrup in finely divided form against a refrigerated surface, and simultaneously and continuously removing the frozen syrup and feeding the same downward to a predetermined point in order to deliver and render the same available for use.

2. The process for instantaneously producing ice cream and delicacies from syrup and other liquids, which, in combination, consists in centrifuging the syrup and continuously spraying a predetermined amount of said centrifuged syrup in finely divided form against a refrigerated surface, and simultaneously and continuously removing the frozen syrup and feeding the same downward to a predetermined point in order to deliver and render the same available for use.

3. The process for instantaneously producing ice cream and delicacies from syrup and other liquids, which, in combination, consists in centrifuging the syrup and continuously spraying a predetermined amount of said centrifuged syrup in finely divided form against a refrigerated surface and simultaneously and continuously removing and whirling the frozen syrup and feeding the same downward while whirling said frozen syrup to a predetermined point in order to deliver and render the same available for use.

4. In a freezing apparatus for freezing syrups, creams and other liquids having a delivery end, the combination, with a congealing chamber and refrigerating means for said chamber, of a single means for centrifugally projecting a predetermined amount of said syrup in finely divided condition against the wall of said congealing chamber, and means simultaneously and continuously removing the frozen syrup from said wall and feeding said removed frozen syrup toward the delivery end of said apparatus.

5. In a freezing apparatus for freezing syrups, creams and other liquids having a delivery end, the combination, with a congealing chamber and refrigerating means for said chamber, of a rotatable single means for centrifugally projecting a predetermined amount of said syrup in finely divided condition against the wall of said chamber and a rotatable feed screw for simultaneously and continuously removing the frozen syrup from said wall and feeding said removed frozen syrup toward the delivery end of said apparatus.

6. In a freezing apparatus for freezing syrups, creams and other liquids having a delivery end, the combination, with a congealing chamber and refrigerating means for said chamber, of a rotatable container for said syrup formed with a calibrated open portion for centrifugally projecting a predetermined amount of said syrup in a finely divided condition against the wall of said congealing chamber, and a rotatable helical member for simultaneously and continuously removing the frozen syrup from said wall and feeding said removed frozen syrup toward the delivery end of said apparatus.

7. In a freezing apparatus for freezing syrups, creams and other liquids having a delivery end, the combination, with a congealing chamber and refrigerating means for said chamber, of a vertical rotatable shaft concentrically disposed with respect to said congealing chamber, a rotatable container for said syrup mounted upon said shaft so as to rotate therewith, and having a calibrated opening for centrifugally projecting a predetermined amount of said syrup in finely divided condition against the wall of said congealing chamber and a helical member in the form of a feed screw fixed upon said shaft for simultaneously and continuously removing the frozen syrup from said wall and feeding said removed frozen syrup toward the delivery end of said apparatus.

8. A freezing apparatus according to claim 7, wherein the upper portion of the congealing chamber is conical in form with its widest portion at the top and wherein the feed screw is correspondingly conical in its upper portion and fits closely in said chamber so as to remove the frozen syrup from the wall of the chamber by scraping off said syrup.

9. A freezing apparatus according to claim 7, wherein the upper portion of the congealing chamber is conical in form with its widest portion at the top and the feed screw is correspondingly conical in its upper portion and fits closely in said chamber so as to remove the frozen syrup from the wall of the chamber by scraping off said syrup, and wherein the rotatable container for the syrup is disposed within the upper portion of said feed screw.

10. A freezing apparatus according to claim 6, wherein the upper portion of the congealing chamber is conical in form with its widest portion at the top and wherein the feed screw is correspondingly conical in its upper portion and fits closely in said chamber so as to remove the frozen syrup from the wall of the chamber by scraping off said syrup.

11. A freezing apparatus according to claim 6, wherein the upper portion of the congealing chamber is conical in form with its widest portion at the top and the feed screw is correspondingly conical in its upper portion and fits closely in said chamber so as to remove the frozen syrup from the wall of the chamber by scraping off said syrup, and wherein the rotatable container for the syrup is disposed within the upper portion of said feed screw.

12. A freezing apparatus according to claim 5, wherein the upper portion of the congealing chamber is conical in form with its widest portion at the top and wherein the feed screw is correspondingly conical in its upper portion and fits closely in said chamber so as to remove the frozen syrup from the wall of the chamber by scraping off said syrup.

13. A freezing apparatus according to claim 7, wherein the upper portion of the congealing chamber is conical in form with its widest portion at the top and the feed screw is correspondingly conical in its upper portion and fits closely in said chamber so as to remove the frozen syrup from the wall of the chamber by scraping off said syrup and feeding the same downwardly toward the delivery end, and wherein the lower portion of said chamber is cylindrical, while the corresponding portion of the helical member within the same is cylindrical and serves to feed the frozen syrup directly downward in order to deliver the same from the apparatus.

14. In a freezing apparatus for freezing syrups, creams and other liquids having a delivery end, the combination, with a congealing chamber and refrigerating means for said chamber of a rotatable vertical shaft concentrically disposed with respect to said congealing chamber, a rotatable container for the syrup fixed upon said shaft so as to rotate therewith, and having a single calibrated aperture for centrifugally projecting a predetermined amount of said syrup in finely divided condition against the wall of said congealing chamber and a feed screw integral with said rotatable chamber and also fixed upon said shaft so as to rotate therewith and simultaneously and continuously removing the frozen syrup from said wall and feeding said removed frozen syrup toward the delivery end of said apparatus.

15. A freezing apparatus according to claim 14, wherein the upper portion of the congealing chamber is flared into a conical form and the corresponding upper portion of the feed screw is helicoidal in form, and wherein the lower portion of the congealing chamber is substantially cylindrical and terminates at the bottom to form the delivery end of the apparatus, and the corresponding portion of the feed screw is a distinct helix disposed below the helicoidal portion of the feed screw which rotates within the conical portion of said congealing chamber.

ALBERTO F. GENOVA.